Sept. 24, 1946.  A. J. SHURTLIFF  2,408,002
BABY JUMPER
Filed Jan. 29, 1944  2 Sheets-Sheet 1
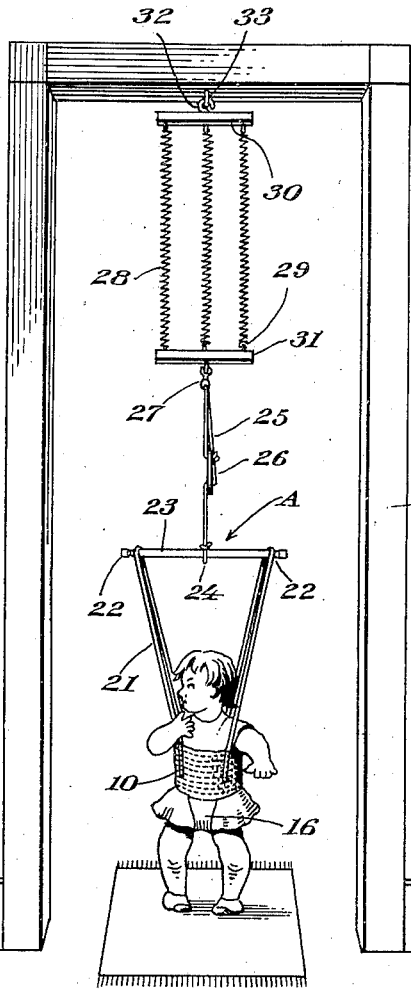
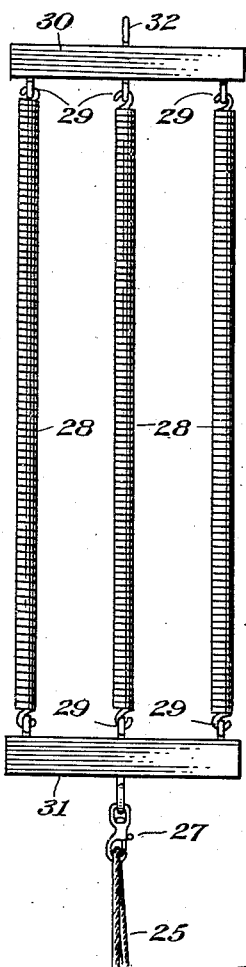
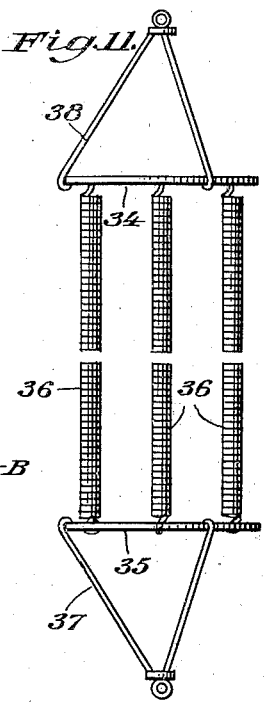
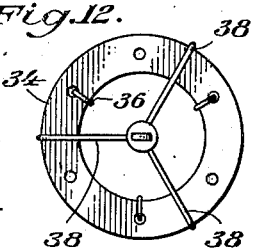
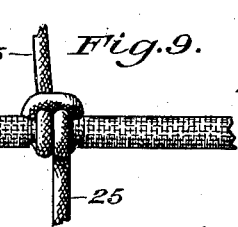
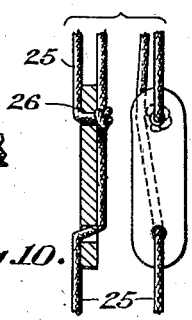
INVENTOR.
Alfred J. Shurtliff:
BY
Victor J. Evans & Co.
ATTORNEYS Sept. 24, 1946.  A. J. SHURTLIFF  2,408,002
BABY JUMPER
Filed Jan. 29, 1944  2 Sheets-Sheet 2
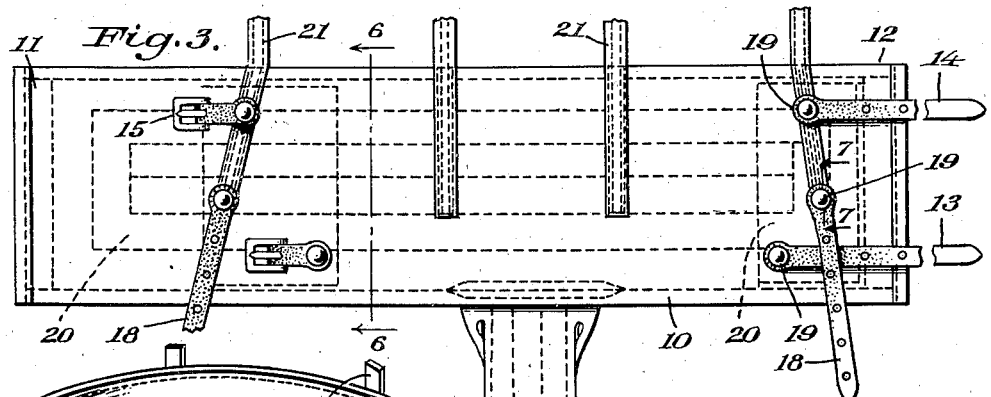
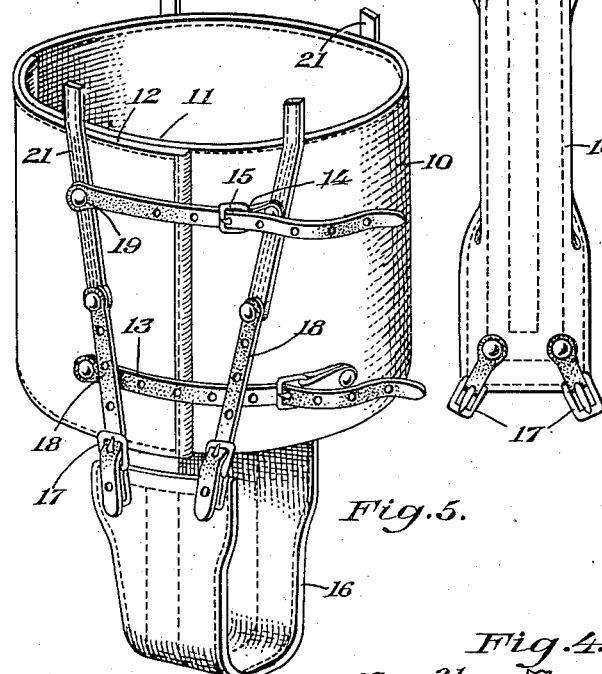
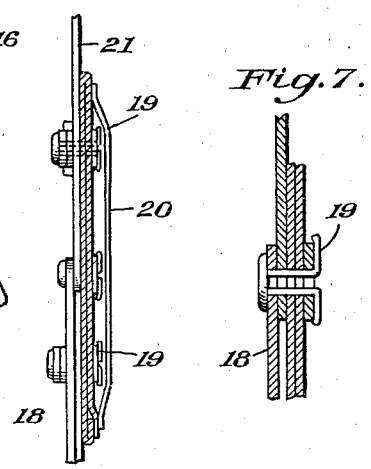
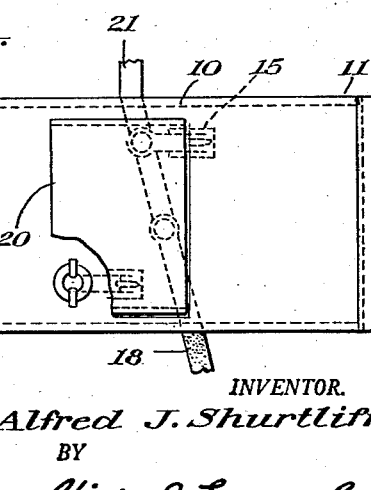
INVENTOR.
Alfred J. Shurtliff:
BY
Victor J. Evans & Co.
ATTORNEYS Patented Sept. 24, 1946

2,408,002

UNITED STATES PATENT OFFICE 2,408,002

BABY JUMPER

Alfred J. Shurtliff, Pocatello, Idaho

Application January 29, 1944, Serial No. 520,295

2 Claims. (Cl. 155—20)

The invention relates to a baby jumper, and more especially to a body developing device for infants.

The primary object of the invention is the provision of a device of this character, wherein an infant of from approximately three months to one year of age can be placed and through jumping action of the device the said infant's body will be tremendously developed. The arms and legs of the infant have unimpaired freedom of movement, the device is effective in operation, and provides fun and amusement to the occupant.

Another object of the invention is to provide a device of this character, wherein the construction permits the locating thereof either outside or inside of an enclosure, and wherein the device is adjustable to enable the same to be used by different sizes of infants.

A further object of the invention is to provide a device of this character, wherein the occupant cannot become injured, and wherein the infant is comfortable and has perfect freedom of the legs and arms, the device being unique and novel in its construction.

A still further object of the invention is to provide a device of this character, which is simple in construction, is thoroughly reliable and effective in operation, is strong, durable, and easy of application and removal, and assures comfort to the user, and is inexpensive to manufacture and install.

With these and other objects in view the invention consists in the features of construction, combination and arrangement of parts as will be hereinafter more fully described in detail, illustrated in the accompanying drawings, which show the preferred embodiment of the invention and pointed out in the claims hereunto appended.

In the accompanying drawings:

Figure 1 is an elevation of the device constructed in accordance with the invention and installed for use.

Figure 2 is a fragmentary elevation on an enlarged scale of the jumper spring set-up.

Figure 3 is a plan view of the body harness of the device.

Figure 4 is a similar view looking toward the other side of the harness and partly broken away.

Figure 5 is a perspective view of the harness as in applied position.

Figure 6 is a sectional view taken on the line 6—6 of Figure 3 looking in the direction of the arrows.

Figure 7 is a fragmentary sectional view on the line 7—7 of Figure 3.

Figure 8 is an elevation of the horizontal hanger bar.

Figure 9 is a fragmentary detail view thereof and partly broken away.

Figure 10 is an exploded detail view of a rope grip used in the device.

Figure 11 is an elevation of a modified form of jumper spring set-up.

Figure 12 is a top plan view of the same.

Similar reference characters indicate corresponding parts throughout the several views in the drawings.

Referring to the drawings in detail, A designates generally a device constructed in accordance with the invention to be supported in working position, for example from the head of a door frame B, or it may be otherwise supported within or without an enclosure, as may be selected.

The device A comprises a body embracing harness involving a body band 10 to encircle the body of an infant, its ends 11 and 12, respectively being adapted to be overlapped when so applied, and separably fastened by buckling straps 13 and 14, the latter equipped with buckles 15, so that said straps can be adjusted for proper fitting of the band. These straps 13 and 14 when the band 10 is worn are located at the rear of the wearer.

Depending from the band 10 is a crotch piece 16, one end of which is permanently fixed to the said band at one side thereof, while the other end carries buckles 17 adjustably and detachably engaging fastening straps 18 on the said band 10 at its other side, to enable the engagement of the crotch piece 16 in the crotch of the infant when the band 10 is being applied.

The fasteners 19 securing the straps 13, 14 and 18 to the band 10 are covered at the inside of the latter with protective pieces 20, as is clearly shown in Figures 4 and 6 of the drawings. Fitted to the band 10 at the front and back thereof is a pair of spaced loop-like hangers 21 which are looped over knobbed ends 22 of a horizontal bar 23, the latter being knot-tied centrally thereof at 24 to the lower end of a suspension cable 25 having an anti-slip grip device 26 for adjustably linking it with a snap hook 27 on a jumper spring set-up.

The jumper spring set-up, preferably comprises a plurality of tensioning springs 28 which have their ends coupled at 29 with upper and lower connector bars 30 and 31. The springs are spaced apart in parallel relation to each other, and the upper bar 30 at its center through hook and eye members 32 and 33, is hung from the center of the head of the door frame B, the lengthening or shortening of the device A being had by the cable 25 on adjustment thereof, so as to have the feet of an infant occupying such device properly contact the floor or ground area. The device A may also be shortened by looping the upper ends of the hangers 21 about the end portions of the bar 23. If the upper ends of the hangers 21 are looped about the bar 23, the device A may be lengthened by removing one or more loops from the hangers.

In Figures 11 and 12 of the drawings there is shown a modified form of jumper spring set-up, wherein there is provided upper and lower ring members 34 and 35, respectively, to which the springs 36 are connected in concentric arrangement thereto. The members 34 and 35 have connected thereto hanger parts 37 and 38, respectively, for attachment to a support and to the harness as will be clearly apparent.

The operation of the device A should be clearly understood from the foregoing and the drawings, so a further explanation has been omitted for the sake of brevity. The number of springs may be varied as the occasion may require to increase or decrease the sensitiveness of the device A in the working thereof.

What is claimed is:

1. A device of the kind described, comprising a body harness having a broad adjustable body band, a crotch piece fixedly attached to the band in front and adjustably connected to the lowermost portion of said band at the back, looplike hangers connected to the uppermost portion of the band at each side thereof, a suspension bar with which said hangers are adapted to be engaged having knobbed ends thereon to retain said hangers on said bar, a jumper spring set-up means, comprising oppositely opposed upper and lower ring members having a plurality of spring members connected thereto in concentric arrangement, a plurality of hanger members connected to said upper member at points intermediate said spring members, said hanger members being connected at their upper end to a circular block having an eye at the medial point thereof for connection to a support at an elevated point, a second set of said hanger members connected to said lower ring member and said suspension bar.

2. The invention as described in claim 1 wherein a suspension cable is provided for connecting said lower hanger to said suspension bar, and an anti-slip grip device is included in said cable for the adjustment thereof.

ALFRED J. SHURTLIFF.